United States Patent [19]

Sakamoto

[11] Patent Number: 4,709,967
[45] Date of Patent: Dec. 1, 1987

[54] WHEEL CAP

[75] Inventor: Fujio Sakamoto, Nagoya, Japan

[73] Assignee: Toyoda Gosei Co., Ltd., Nishikasugai, Japan

[21] Appl. No.: 807,583

[22] Filed: Dec. 11, 1985

[30] Foreign Application Priority Data

Dec. 14, 1984 [JP] Japan .................... 59-190594[U]
Dec. 20, 1984 [JP] Japan .................... 59-193699[U]

[51] Int. Cl.4 .............................. B60B 7/06
[52] U.S. Cl. .................... 301/37 P; 301/37 R
[58] Field of Search ............... 301/37 P, 37 C, 37 R, 301/10 BP, 37 CD, 37 TP

[56] References Cited

U.S. PATENT DOCUMENTS

| | | |
|---|---|---|
| 3,671,076 | 6/1972 | Aske, Jr. . |
| 3,747,984 | 7/1973 | Andrews et al. .................. 301/37 P |
| 4,027,919 | 6/1977 | Foster et al. .................... 301/37 TP |
| 4,363,520 | 12/1982 | Connell ......................... 301/37 R X |
| 4,529,251 | 7/1985 | Schobbe ........................... 301/37 P |

FOREIGN PATENT DOCUMENTS

| | | | |
|---|---|---|---|
| 3016619 | 11/1981 | Fed. Rep. of Germany .... | 301/37 P |
| 5779703 | 6/1980 | Japan ................................ | 301/37 R |
| 57-10901 | 9/1982 | Japan . | |
| 2113158 | 8/1983 | United Kingdom ............. | 301/37 R |

Primary Examiner—David A. Scherbel
Attorney, Agent, or Firm—Cushman, Darby & Cushman

[57] ABSTRACT

A wheel cap (i.e., a wheel cover or hub cap) which has a plurality of stopper parts disposed along the circumferential direction of a circumferential part of a base part and each having a stopper surface opposed to the inner peripheral surface of a wheel disk with a gap therebetween, and a ring holder in an endless annular form having a single looped flexible part along the circumferential direction. Using a wheel cap of this structure, the wheel cap is easily fitted to the wheel disk by a small spring load with light weight, and is prevented from being set into an eccentric state when being fitted or upon an impact. Owing to the improved fittability to the wheel disk the wheel cap is not likely to slip off, and effective utilization of an arranging space is made. Furthermore, the wheel cap is accurately produced with ease.

7 Claims, 22 Drawing Figures

WHEEL CAP

BACKGROUND OF THE INVENTION

1. Field of the Invention

This invention relates to an improvement in a wheel cap fitted to a wheel disk of an automobile or the like, and particularly to a wheel cap which can be fitted to a wheel disk easily and appropriately.

2. Description of the Prior Art

Recently, the demand for decreasing the weight of an automobile has been increased, and resin-made wheel caps have come to be used in place of metal-made ones. As a resin-made wheel cap, there is known a wheel cap which has a plurality of engaging parts disposed on the same circumference of circle on the back side of the wheel cap and a wire-type ring holder for urging the engaging parts in the radially outward direction for pressing them against the wheel disk, thereby engaging the wheel cap to the wheel disk. FIG. 17 shows a plan view of a conventional wheel cap with a ring holder, and FIG. 18 shows a cross-sectional view of an essential part of the cross-section in the normal condition wherein the wheel cap is fitted to a wheel disk. As shown in the figures, in the conventional wheel cap, an engaging part 2' projected from a base part 1' has a projection part 21' oscillated through appropriate elastic deformation, and is pressed against the wheel disk 6 by being urged in the radially outward direction by the ring holder 5'. The engaging part needs to be firmly fixed to the wheel disk and needs to have appropriate stiffness. For this purpose, the engaging part 2' is increased in general material thickness as shown in FIG. 18, or is provided with an appropriate reinforcing rib 22 as shown in FIG. 19. Accordingly, this type of conventional wheel cap can not necessarily be fitted easily, and the product weight thereof is relatively large.

When fitting such a wheel cap to a wheel disk, the part near a valve hole of the cap is first fitted to the wheel disk, and the opposite side is knocked-in later; therefore, the engaging part on the knocked side is greatly deformed, and the deformation is not recovered, resulting in that the wheel cap is fitted in an eccentric state and is liable to slip off. Also, after fitting, some of the engaging parts are similarly deformed greatly when an impact load is exerted thereon during running of the vehicle, leading to the trouble that the wheel cap becomes liable to slip off.

As a wheel cap free from the above-mentioned problems, there is known one which does not have the ring holder, as shown in FIG. 20 (Japanese Utility Model Application Laid-Open No. 57-10901 (1982). This wheel cap is characterized in that a clip 7 is provided on the inside surface thereof and a projected part 8 is provided in the direction of the inner peripheral surface thereof independently from the clip 7 so as to make contact with the inner peripheral surface of the wheel disk. Since deformation of the clip 7 is prevented by the contact of the projected part 8 with the wheel disk, this wheel cap is prevented from being fitted in an eccentric state. The wheel cap, however, has the problem that the shapes of the clip 7 and the peripheral part thereof are complicated, and it is generally difficult to produce the wheel cap (particularly, as one body) accurately and easily.

There is also known a wheel cap with a ring holder (A) which has an annular overall configuration and is provided with a plurality of stepped projected parts (a) bent in the direction of the outer periphery, as shown (in half) in FIG. 21, and a wheel cap with a ring holder (B) which is provided with projected parts (b) curved in the direction of the outer periphery, as shown in FIG. 22. In the former ring holder (A), the engaging part (not shown) of a base part (not shown) is urged in the radially outward direction by the projected parts (a). In the latter ring holder (B), the projected parts (b) themselve serve also as the engaging part. The ring holder (A) has a problem in workability such as dimensional accuracy because of its complicated shape. On the other hand, the ring holder (B) has the problem that it is poor in flexibility and can not be fitted to the base part easily.

SUMMARY OF THE INVENTION

This invention has been attained in view of the above-mentioned.

Accordingly, an object of this invention is to provide a wheel cap which can be easily fitted by a small spring load, is light in weight, is prevented from being set into an eccentric state when being fitted or upon an impact, is therefore not liable to slip off, and is easy to produce.

Another object of this invention is to provide a wheel cap which has a ring holder having a simple shape and which is excellent in fittability to a wheel cap main body, has improved fittability to the wheel disk, and enables effective utilization of arranging space.

These objects are attained by providing a plurality of stopper parts (i.e., stops) disposed along the circumferential direction of a circumferentially extending part of a base part and each having a stopper surface (i.e., a stop surface) opposed to the inner peripheral surface of the wheel disk with a gap therebetween, and by providing a ring holder in an endless annular form having a single looped flexible part extending a short distance along the circumferential direction.

BRIEF DESCRIPTION OF THE DRAWINGS

FIGS. 6 to 13 each show a wheel cap of Example 2 in which

FIG. 6 shows a back view of the wheel cap of Example 2;

FIG. 7 shows a plan view of a wire spring;

FIG. 8 and 9 each show a cross-sectional view of an essential part illustrating the condition wherein the wheel cap of Example 2 is pressed against the wheel disk;

FIGS. 10, 11, 12 respectively show a cross-sectional view of an essential part of FIG. 6; and FIG. 13 illustrates the arranging angle of the flexible part;

DETAILED DESCRIPTION OF THE INVENTION

The wheel cap of the present invention has a circular disk form base part, a plurality of engaging parts elastically deformable in the radial direction disposed at a circumferential part of the base part and engaged with an inner peripheral surface of a wheel disk. A plurality of stopper parts are disposed along the circumferential direction of the circumferential part of the base part of the wheel cap and each comprising a stopper surface opposed to the inner peripheral surface of the wheel disk with a gap therebetween. The stopper surfaces of the stopper parts of the wheel cap and the inner peripheral surface of the wheel disk are brought into contact with each other to hold the base part when the base part is strongly pressed against the inner peripheral surface of said wheel disk. A ring holder is provided in an endless annular form, having a single looped flexible part along the circumferential direction, and being held by the engaging parts to urge the engaging parts in the radially outward direction.

Figure 1:
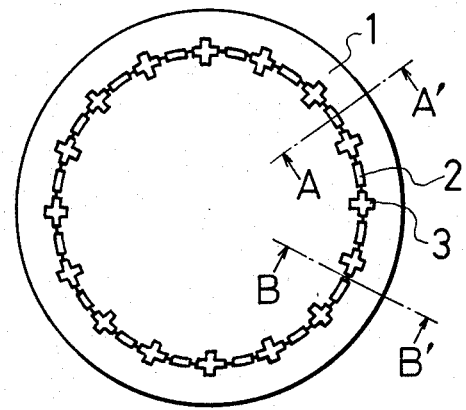
FIG. 1 shows a back view of a wheel cap according to Example 1.

The base part of the wheel cap according to this invention constitutes a major part of the wheel cap, covers a wheel disk and provides mainly a decorative property. The base part may have any of various shapes selected from the viewpoints of the shape of the wheel disk and decorative property. In general, the base part is in the form of a circular disk as shown in FIG. 1.

Figure 4:
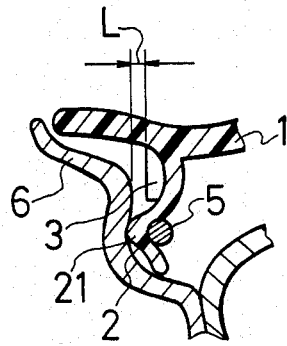
FIG. 4 shows a cross-sectional view of an essential part of the cross-section in the normal condition wherein the wheel cap of Example 1 is fitted to the wheel disk.

The engaging parts of the wheel cap according to this invention are disposed at a circumferential part of the base 1, engaged with the inner peripheral surface of the wheel disk 6, elastically deformable in the radial direction and provided in plurality, as shown in FIG. 4, for example. Each of the engaging parts comprises a recessed part for fitting a ring holder 5 therein on the opposite side of the inner peripheral surface of the wheel disk, and under the function of the ring holder 5, a projected part 21 of the engaging part is urged in the centrifugal direction (i.e., towards radial expansion which involves both radially outward motion and growth in circumference) and is engaged to the inner peripheral surface of the wheel disk 6. The projected part 21 must be deformed in a direction which is opposite to the centrifugal direction, i.e., towards radial contraction which involves both radially inward motion and shrinkage in circumference, when fitting or detaching the wheel cap. For this purpose, the engaging part is projected from the base part, and the projected part 21 thereof is oscillated through elastic deformation of the engaging part itself.

Figure 5:
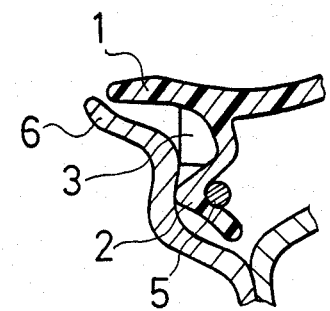
FIG. 5 shows a cross-sectional view of an essential part of the cross-section in the normal condition wherein the wheel cap of Example 1 is fitted to the wheel disk and the base part of the cap is strongly pressed against the inner peripheral surface of the wheel disk.

One characteristic feature of this invention is that the base part is provided with a plurality of stopper parts. The stopper parts 3 are disposed along the circumferential direction of a circumferential part of the base part 1, each have a stopper surface opposed to the inner peripheral surface of the wheel disk 6 with a gap therebetween and are provided in plurality, as shown in FIGS. 1 to 5, for example. In the normal condition wherein the wheel cap of this invention is fitted to the wheel disk 6 as shown in FIG. 4, the gap (L) between the outer peripheral surface of the stopper part 3 and the inner peripheral surface of the wheel disk 6 is generally not larger than 3 mm, though it depends on the shape and size of the wheel disk 6 or the like. However, when the base part 1 is strongly pressed against the inner peripheral surface of the wheel disk 6 as shown in FIG. 5, the stopper surfaces of the stopper parts 3 come into contact with the inner peripheral surface of the wheel disk 6 to hold the base part 1. The stopper part 3 is generally constituted of a rigid body.

Figure 3:
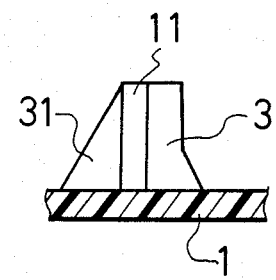
FIG. 3 shows a cross-sectional view of an essential part of the wheel cap of Example 1 shown in FIG. 1, taken along line B–B'.

The form of the stopper part can be selected from various forms (cross-sectional shape, length in the radial direction, thickness, height, presence or absence of a reinforcing rib extending in the radial direction, etc.), provided that the stopper surface of the stopper part comes into contact with the inner peripheral surface of the wheel disk when the base part is strongly pressed against the inner peripheral surface of the wheel disk. For instance, the stopper part is provided with a reinforcing rib 31 extending in the radially outer direction as shown in FIGS. 1 and 3, and the plan shape thereof can be a cross.

The number of the stopper parts is not particularly limited, provided that it is more than one. However, at least three stopper parts are required.

The base part, the engaging parts and the stopper parts are generally produced as one body. In general, the parts are formed from a resin.

The ring holder of the wheel cap according to this invention is held in the recessed parts of the engaging parts 2, as shown in FIG. 4, and urges the engaging parts 2 in the centrifugal direction. The shape, material and the like of the ring holder may be as usual.

In the wheel cap according to this invention, the general material thickness of the engaging parts or the like can be reduced as compared to that in a conventional wheel cap comprising a ring holder. In addition, a lighter product weight can be contrived because the engaging parts need not be reinforced by reinforcing ribs, and the wheel cap can be securely fitted by a small spring load because the engaging parts are easily deformable. Further, since the wheel cap is light in weight, an acceleration G acting at the time of an impact is small, so that the wheel cap of this invention is less liable to slip upon the impact than a conventional wheel cap.

Also, in the wheel cap of this invention, the stopper surfaces of the stopper parts come into contact with the inner peripheral surface of the wheel disk when the base part is strongly pressed against the inner peripheral surface of the wheel disk. Therefore, even when an impact in excess of the spring load of the ring holder acts on the wheel cap, the impact energy can be absorbed by the stopper parts, and the engaging parts are not too much deformed so that the wheel cap of this invention is less liable to slip off than a conventional wheel cap.

Furthermore, the wheel cap of this invention has a ring holder and the shapes of the engaging parts and the stopper parts are simpler than those of a conventional wheel cap provided with anti-eccentricity projected parts but not provided with a ring holder. Therefore, the wheel cap of this invention can be produced accurately and easily, and can be easily formed as one body.

Another characteristic feature of this invention is the shape of the ring holder.

The ring holder is in an endless annular form in appearance, has a single looped flexible part along the circumferential direction, which provides desired flexural characteristics. The looped flexible part may take the form of an at least one-ply continuous winding, thereby increasing the flexural characteristics. The looped flexible part may be substantially in the form of the Greek letter $\Omega$ (omega), in which case the presence of a separate part provides a large deformation. The shape of the flexible part, in this case, can be selected from various ones such as $\Omega$-shape, U-shape and V-shape. In addition, the looped flexible part may be disposed in a plane having a predetermined angle from the radial direction to the axial direction of the wheel cap, which ensures a proper arrangement in view of the installation space. The ring holder may be either solid or hollow, and the cross-sectional shape thereof may be circular, elliptic, square, rectangular or the like. The ring holder is generally formed from a metal, and a highly elastic spring steel is particularly preferred as a material for the ring holder.

The ring holder is preferably provided with a projected part which is projected outward beyond the engaging part when the ring holder is fitted to a wheel cap main body. Namely, when the wheel cap is pressed against the wheel disk, the projected part comes into contact with the surface of the wheel disk. Therefore, metal and metal contact with each other at the contact part, resulting in that the frictional resistance in the circumferential direction of the wheel cap is increased as compared to the case of the contact of the resin-made engaging part with the wheel disk. Accordingly, the frictional resistance restrain the wheel cap from moving in the circumferential direction relative to the wheel disk at the time of acceleration or deceleration of the vehicle. In addition, the projected part functions also as a stopper part of the engaging parts of the wheel cap, that is, it prevents the circumferential relative movement of the wheel cap and the ring holder, thereby preventing further securely the circumferential movement of the wheel cap relative to the wheel disk. Alternatively, the wheel cap main body may be provided with a projected part projected in the axial direction and the projected part may be inserted into the looped flexible part of the ring holder, thereby preventing the circumferential relative movement.

The wheel cap of this invention constituted as mentioned above can secure a proper fitting load for fitting the wheel cap main body to the wheel disk by the ring holder having the looped flexible part, and can increase the degree of freedom in fitting. Namely, the fitting stiffness for the wheel cap main body can be sufficiently satisfied by properly selecting the shape, structure and arrangement configuration of the looped flexible part of the ring holder. In addition, the looped flexible part can be arranged at a predetermined angle from the radial direction to the axial direction of the wheel cap, thereby ensuring effective utilization of arrangement space. Further, where the ring holder is provided with the projected part, the circumferential movement of the wheel cap relative to the wheel disk can be securely prevented.

Moreover, in the wheel cap according to this invention, the ring holder has a simple structure with few bends. Therefore, the wheel cap has improved workability, and is less liable to deform under repeated use. In addition, the wheel cap can be fitted securely to the wheel disk by simple assembling and fitting operations, and the stable fitted condition can be maintained, with high reliability.

EXAMPLES

This invention will be described referring to Examples as follows.

(EXAMPLE 1)

Figure 2:
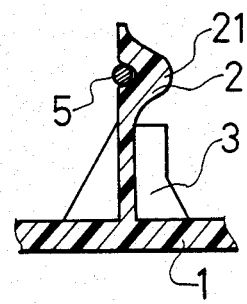
FIG. 2 shows a cross-sectional view of an essential part of the wheel cap of Example 1 shown in FIG. 1, taken along line A14 A'.

FIG. 1 shows a back view of the wheel cap of this example, FIG. 2 shows a cross-sectional view taken along line A—A- of FIG. 1, FIG. 3 shows a cross-sectional view taken along line B—B' of FIG. 1, and FIG. 4 shows a cross-sectional view of an essential part of the wheel cap of this example in the normal state of being fitted to the wheel disk.

The wheel cap comprises a circular disk form base part 1, 16 engaging parts 2 disposed at the circumferential part of the base part 1, a ring holder 5 held by the engaging parts 2 and urging the engaging parts 2 in the centrifugal direction, and 16 stopper parts 3 disposed along the circumferential direction of the circumferential part of the base part 1.

The base part 1 is in the form of a circular disk having a diameter of 350 to 400 mm (general thickness is 1.5 to 3 mm). The engaging parts 2 are each provided with a projected part 21 to be engaged to the inner peripheral surface of the wheel disk and elastically deformable in the radial direction. The height of the projected part depends on the size and shape of the wheel disk. The stopper parts 3 each comprise a stopper surface opposed to the inner peripheral surface of the wheel disk 6 with a gap of not larger than 3 mm therebetween, and the plan shape thereof is rectangular or a cross. The material thickness of the stopper part is 1 to 2 mm in any case, and the height of the stopper part depends on the size and shape of the wheel disk. In the stopper part 3, the part extending in the radially outward direction as shown in FIG.3 is a reinforcing rib 31. The rib 31 is triangular in the cross section along the line B—B'. The base part 1, the engaging parts 2 and the stopper parts 3 are molded as one body from a thermoplastic resin.

The ring holder 5 is formed of a spring steel having a diameter of 2 to 3.5 mm.

When the wheel cap of this example is press-fitted to the wheel disk 6, the stopper surfaces of the stopper parts 3 are spaced about 3 mm from the inner peripheral surface of the wheel disk 6, as shown in FIG. 4.

In the wheel cap of this example, when the base part 1 is strongly pressed against the inner peripheral surface of the wheel disk 6 as shown in FIG.5, namely, when a high impact acts on the wheel cap, the stopper surface of the stopper parts 3 comes into contact with the inner peripheral surface of the wheel disk 6, thereby holding the base part 1. Therefore, the wheel cap of this example is less liable to slip off the wheel disk even upon an impact. Namely, the impact energy exceeding the spring load can be absorbed by the stopper parts 3.

Since the wheel cap of this example comprises the stopper parts 3 as described above, the material thickness of the engaging parts 2 can be reduced. Therefore, the wheel cap can be reduced in weight. In addition, the thinness of the engaging parts 2 ensures easy deformation thereof, leading to easy fitting of the wheel cap. Further, the light product weight leads to less acceleration G at the time of collision, so that the wheel cap is less liable to slip off.

(EXAMPLE 2)

Figure 6:
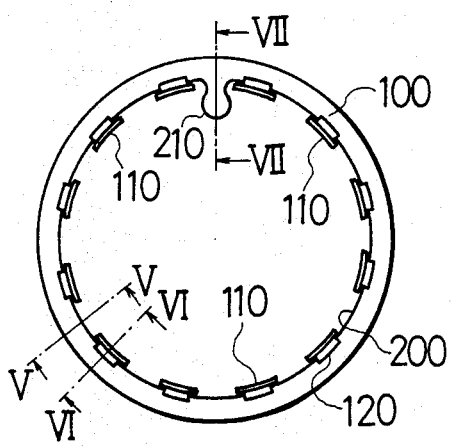
Figure 7:
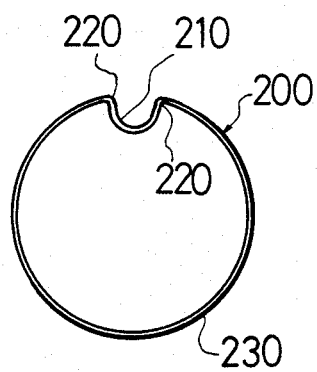
Figure 8:
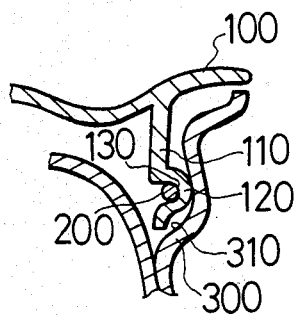

FIGS. 6 to 13 illustrate Example 2 of this invention, in which FIG.6 shows a back view of the wheel cap of this example. The wheel cap comprises a plastic-made wheel cap main body 100 and a solid wire spring (ring holder) 200. The main body 100 comprises a multiplicity of engaging parts 110 disposed on the same circumference of circle on the back side thereof and projected in the axial direction. The engaging parts 110 each have a projected part 120 of which the circumferential direction as viewed from the side conforms to the shape of a recessed part of the wheel disk 300, as shown in FIG.8. The wheel cap main body 100 is fitted to the wheel disk 300. The main body 100 is provided with a groove 130 for holding the solid wire spring 200 on the inner side of the projected parts 120. The wire spring 200 is annular in appearance, as shown in FIG.7, and is positioned by fitting a part thereof into the groove 130. The wire spring 200, with its elasticity, urges the projected parts 120 in the direction for pressing against the recessed part 310 of the wheel disk 300, thereby it press fitting the wheel cap main body 100 to the wheel disk 300.

Figure 12:
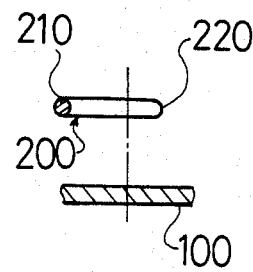

The wire spring in this example is provided with a single radially outwardly concave looped flexible part 210 having the shape of the Greek letter Ω (omega) disposed to the inside of the circumference of the larger, nearly circumferentially complete hoop provided by the wire spring 200, as shown in FIG. 7. The flexible part 210 is separated by opposed bent-back parts 220, and the presence of the separate parts ensures a large deformation. The flexible part 210 is disposed in a plane parallel to the axial direction of the wheel cap main body 100, as shown in FIG. 12 which is a cross-sectional sectional view taken along line VII—VII of FIG. 6.

In other words, the ring holder 200 is an endless annular member which includes an arc portion 230 adapted to engage with the engaging parts 110 and a looped flexible portion 210 which extends between and joins angularly spaced sites 220 on the arc portion 230 in such a manner that the looped flexible portion extends radially inwards from the circumference of an imaginary circle on which the arc portion 230 lies, the looped flexible portion 210 and the arc portion 230 being curved about respective axes which are substantially parallel to one another.

Figure 9:
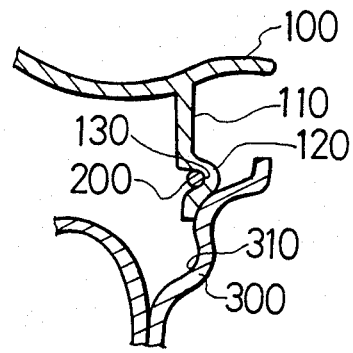
Figure 10:
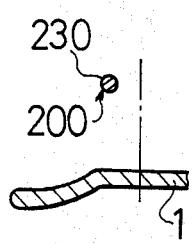
Figure 11:
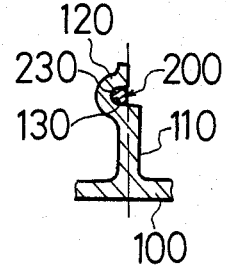

In this example, to fit the wheel cap main body 100 to the wheel disk 300, an annular part 230 of the wire spring 200 is previously fitted into the groove 130 of the main body 100, as shown in FIG.11 which is a cross-sectional view taken along line VI—VI of FIG. 6. Then, the projected parts 120 of the main body 100 are deviated to the inside against the elastic force of the wire spring 200 and inserted into the recessed part 310 of the wheel disk 300, as shown in FIG.9. As a result, the engaging parts of the main body 100 are pressed agains the recessed part 310 of the wheel disk 300 by the elastic force of the wire spring 200, and axial movement of the main body 100 is restricted by the engagement of the engaging parts 110 and the recessed part 310. Therefore, the wheel cap main body 100 is fitted to the wheel disk 300 at a predetermined positon. Accordingly, even when a deforming force is externally exerted on the wheel disk 300, the looped flexible part 210 of the wire spring 200 fitted in the wheel cap main body 100 sensitively deforms elastically and in a large amount, so that the deforming force is sufficiently absorbed by the flexible part 210, and a stable and smooth fitted condition can be secured. Thus, this example can secure a proper fitting load for fitting the wheel cap main body 100 to the wheel disk 300 by the presence of the looped flexible part 210.

The wire spring 200 in this example is formed of a spring steel having a diameter of 2 to 3.5 mm, and the degree of freedom for the fitting load can be increased by changing the diameter of the wire spring 200 or the diametral dimension of the flexible part 210.

Figure 13:
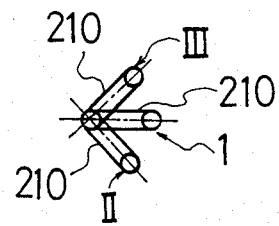

As shown in FIG. 13, the flexible part 210 can be disposed in a plane is in a parallel relationship I, a 45° inclined relationship II or a reversely 45° inclined relationship III with respect to the radial direction of the wheel cap main body 100, thereby coping with the arrangement space at the narrow part of the main body 100 and the wheel disk 300, and ensuring effective utilization of the space for containment.

Figure 14:
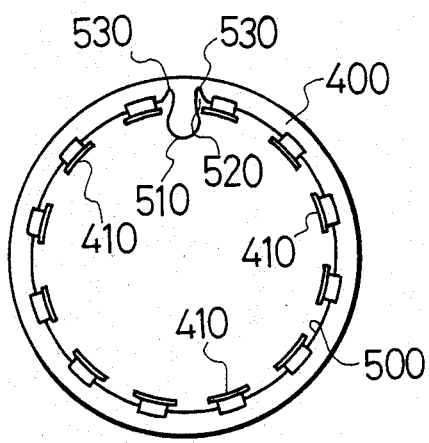
FIG. 14 shows a back view of the wheel cap according to a modification of Example 2.
Figure 15:
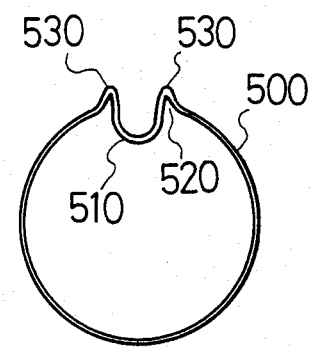
FIG. 15 shows a plan view of a wire spring of the wheel cap according to a modification of Example 2.

FIGS. 14 and 15 each show a modification of Example 2, in which the construction is the same as that in Example 2 except that the shape of the looped flexible part of the wire spring is changed. Namely, the wire spring 500 comprises a single looped flexible part 510, which is Ω-shaped and separated by opposed bent-back parts 520, and is disposed in parallel with the radial direction of the wheel cap 400 and toward the inside of the wire spring 500. The bent-back part 520 consists of a substantially U-shaped projected part 530 extending in parallel to the radial direction of the wheel cap 400 and toward the outside of the wire spring 500.

The thus constituted wire spring 300 is fitted to the wheel cap 400 and pressed against the wheel disk, in the same manner as in Example 2. In the wheel cap 400 of this example, in this case, the engaging parts 410 of the wheel cap 400 are pressed against the wheel disk, and the two projected parts 530 of the wire spring 500 are pressed against the wheel disk, whereby the frictional resistance in the circumferential direction of the wheel cap 400 is increased, and the projected parts 530 function as stopper parts for the engaging parts 410, thereby ensuring a further easier following-up to the variation in the rotating motion of the wheel. In addition, elastic deformation of the looped flexible part 510 secures a smooth press-fitted condition.

Figure 16:
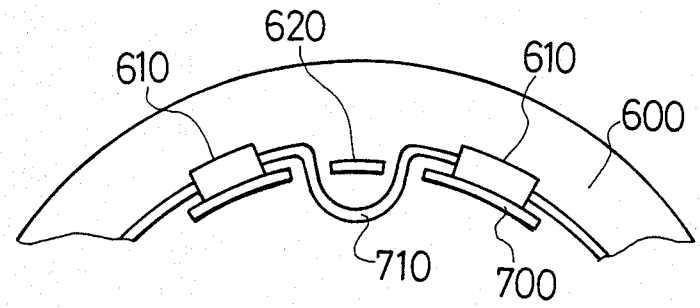
FIG. 16 shows a back view of an essential part of a wheel cap according to another modification of Example 2.
Figure 17:
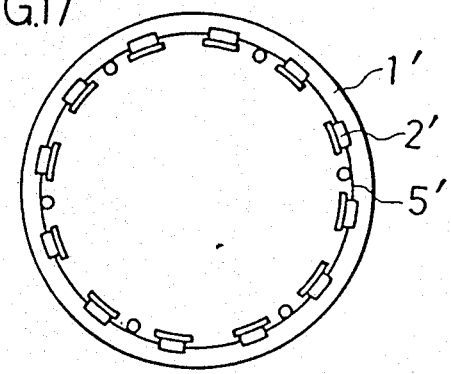
FIG. 17 shows a plan view of a conventional wheel cap.
Figure 18:
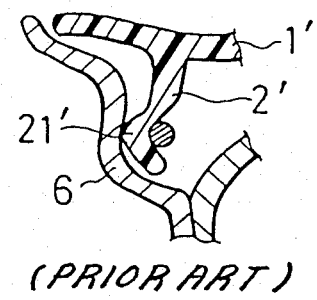
FIG. 18 shows a cross-sectional view of an essential part showing the cross-section in the normal condition wherein the conventional wheel cap shown in FIG. 17 is fitted to a wheel disk.
Figure 19:
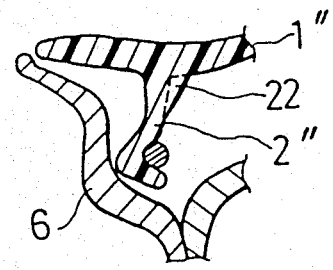
FIG. 19 shows a cross-sectional view of an essential part showing the cross-section in the normal condition wherein a conventional wheel cap comprising engaging parts each provided with a reinforcing rib is fitted to a wheel disk.
Figure 20:
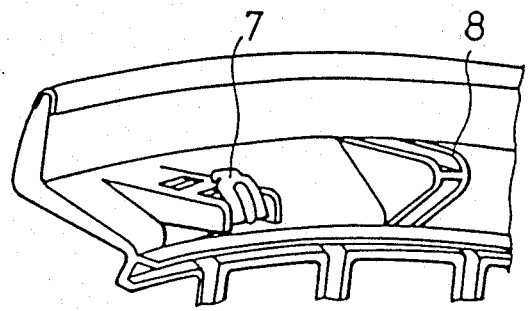
FIG. 20 shows a perspective view of a conventional wheel cap which does not have a ring holder.
Figure 21:
FIGS. 21 and 22 each show a broken plan view of an essential part of a conventional wire spring.
Figure 22:
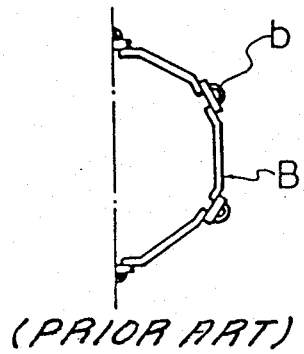

FIG. 16 shows another modification of example 2, in which the construction is the same as that in Example 2 except that a single axially projected part 620 is provided between two of the engaging parts 610 arranged on the back side of the wheel cap main body 600, the projected part 620 being disposed on the same circumference of circle as for the engaging parts 610. Namely, the wire spring 700 is held by the wheel cap main body 600 in such a position that the projected part 620 is inserted in the looped flexible part 710 of the spring 700. Therefore, the projected part 620 functions as a stopper part for the wire spring 700, thereby securely preventing the relative movement of the spring 700 and the wheel cap main body 600 and ensuring assured following-up to the variations in the rotating motion of the wheel.

Example 2 and the modifications thereof can sufficiently cope with the fitting stiffness (load) for fitting the wheel cap main body to the wheel disk, by modifying the size, shape or arranging angle (against the axial direction of the wheel cap) of the looped flexible part, or changing the cross-sectional diameter or the overall diameter of the wire spring or by the use of a hollow wire, etc. Thus, these examples have excellent practical effects such as sufficiently coping with the arrangement space.

I claim:

1. A wheel cap adapted to be mounted to a wheel disk so as to cover at least a portion thereof, by engagement with an inner peripheral surface of an axially accessible face of the wheel disk, said wheel cap comprising:
   a circular disk form base part;
   a plurality of axially extending, circumferentially spaced engaging parts which are elastically deformable in a radial direction relative to said base part, said engaging parts being disposed on a circumferential part of said base part and arranged to be engaged with said inner peripheral surface of a wheel disk when said wheel cap is mounted to said wheel disk;
   a plurality of stopper parts disposed along the circumferential direction of the circumferential part of said base part and each comprising a stopper surface arranged to be opposed to the inner peripheral surface of said wheel disk with a gap usually existing between said stopper surfaces of said stopper parts and the inner peripheral surface of said wheel disk when said wheel cap is mounted to said wheel disk, but being arranged for temporarily coming into contact with said inner peripheral surface when said base part is temporarily strongly pressed against the inner peripheral surface of said wheel disk; and
   a ring holder held by said engaging parts and urging said engaging parts radially outwards into resilient engagement with said inner peripheral surface of said wheel disk, said ring holder being an endless annular member which includes an arc portion adapted to engage with said engaging parts and a looped flexible portion which extends between and joins angularly spaced sites on said arc portion in such a manner that the looped flexible portion extends radially inwards from the circumference of an imaginary circle on which said arc portion lies, the looped flexible portion and the arc portion being curved about respective axes which are substantially parallel to one another.

2. A wheel cap according to claim 1, wherein said looped flexible portion is radially outwardly concave and is interposed in said ring holder so as to extend less than the distance between two of said engaging parts along the circumferential direction of said arc portion.

3. A wheel cap according to claim 2, wherein said looped flexible portion is in the form of an at least one-ply continuous winding.

4. A wheel cap according to claim 2, wherein said looped flexible portion is in the shape of the Greek letter $\Omega$ (omega).

5. A wheel cap according to claim 1, wherein said engaging parts each comprise a reinforcing rib extending radially outwards therefrom.

6. A wheel cap according to claim 1, wherein said engaging parts are at least three.

7. A capped wheel disk, comprising:
   a wheel disk having an accessible outer face provided with an inner peripheral surface; and
   a wheel cap removably mounted to said wheel disk so as to cover at least a portion of said outer face, said wheel disk comprising:
   a plurality of axially extending, circumferentially spaced engaging parts which are elastically deformable in a radial direction relative to said base part, said engaging parts being disposed on a circumferential part of said base part and resiliently engaged with said inner peripheral surface of said wheel disk for mounting said wheel cap to said wheel disk;
   a plurality of stopper parts disposed along the circumferential direction of the circumferential part of said base part and each comprising a stopper surface arranged to be opposed to the inner peripheral surface of said wheel disk with a gap usually existing between said stopper surfaces of said stopper parts and the inner peripheral surface of said wheel disk when said wheel cap is mounted to said wheel disk, but being arranged for temporarily coming into contact with said inner peripheral surface when said base part is temporarily strongly pressed against the inner peripheral surface of said wheel disk; and a ring holder held by said engaging parts and urging said engaging parts radially outwards into resilient engagement with said inner peripheral surface of said wheel disk, said ring holder being an endless annular member which includes an arc portion adapted to engage with said engaging parts and a looped flexible portion which extends between and joins angularly spaced sites on said arc portion in such a manner that the looped flexible portion extends radially inwards from the circumference of an imaginary circle on which said arc portion lies, the looped flexible portion and the arc portion being curved about respective axes which are substantially parallel to one another.

* * * * *